United States Patent
Reinsch et al.

(10) Patent No.: US 7,017,624 B2
(45) Date of Patent: Mar. 28, 2006

(54) SYSTEM AND METHOD FOR DISPENSING PARTICULATE MATERIAL INTO A FLUID MEDIUM

(75) Inventors: Frank G. Reinsch, Kansas City, MO (US); John A. Latting, Kearney, MO (US)

(73) Assignee: Rosen's, Inc., Fairmont, MN (US)

( * ) Notice: Subject to any disclaimer, the term of this patent is extended or adjusted under 35 U.S.C. 154(b) by 229 days.

(21) Appl. No.: 10/653,022

(22) Filed: Aug. 29, 2003

(65) Prior Publication Data

US 2004/0232163 A1     Nov. 25, 2004

Related U.S. Application Data

(60) Provisional application No. 60/473,376, filed on May 23, 2003.

(51) Int. Cl.
*B65B 1/30*     (2006.01)
(52) U.S. Cl. .......................................... 141/83; 141/198
(58) Field of Classification Search ............... 141/198, 141/83, 71, 72, 74
See application file for complete search history.

(56) References Cited

U.S. PATENT DOCUMENTS

| | | | |
|---|---|---|---|
| 3,697,052 A | 10/1972 | Andris | |
| 5,147,152 A | 9/1992 | Link | |
| 5,573,149 A | 11/1996 | Saito | |
| 5,803,673 A | 9/1998 | Reinsch et al. | |
| 6,425,529 B1 | 7/2002 | Reinsch et al. | |

OTHER PUBLICATIONS

Letter from F. Reinsch to T. Pekarek re delivery system, 1999.
Letter from F. Reinsch to J. Latting re ACCU-BIN™ system 1999.
Flexicon Bulk Bag Discharger, 2002, Flexicon Corporation.

*Primary Examiner*—Philippe Derakshani
(74) *Attorney, Agent, or Firm*—Fish & Richardson P.C., P.A.

(57) ABSTRACT

A device for dispensing particulate matter may include a gravimetric sensor to measure the weight of particulate matter mixed with a fluid carrier. In an illustrative embodiment, a dry chemical inductor includes a bin for containing particulate matter, a conduit for transporting a stream of liquid carrier, and a valve for controllably releasing a particulate matter from the bin into the conduit. The device may further include a gravimetric sensor, such as an electronic scale or a load cell, for measuring the weight of particulate matter released from the bin. A controller may receive signals from the gravimetric sensor and actuate the valve to interrupt the flow of particulate matter when the desired amount of particulate matter has been released.

61 Claims, 8 Drawing Sheets

SYSTEM AND METHOD FOR DISPENSING PARTICULATE MATERIAL INTO A FLUID MEDIUM

CROSS-REFERENCE TO RELATED APPLICATION

This application is a continuation of provisional application Ser. No. 60/473,376, entitled "Distributed Control Architecture and Improved Metering Apparatus and Methods for Agricultural Chemical Dispensers" and filed on May 23, 2003, the contents of which are incorporated by reference.

BACKGROUND

Agricultural chemicals and other such products are typically distributed in dry bulk form, either as powders, granules, or small pellets, but are ultimately dissolved into a liquid carrier for application by spraying or irrigation equipment. This practice of transporting chemical materials in dry form offers certain cost and space-saving advantages over transporting those chemicals in liquid form. In addition, governmental regulations regarding the transportation of chemical materials are generally more lenient if the material is shipped in dry form rather than liquid form.

A user of such agricultural chemicals may purchase the material in dry form, either in bags or bins, and mix the chemicals with water or another liquid carrier as needed. For example, the chemicals may be mixed with a liquid carrier immediately before applying the chemicals onto the targeted crops by pouring the dry chemicals and liquid carrier separately into a mixing tank. In another example, an empty tanker may be transported to a chemical distributor who, in turn, dispenses a pre-mixed solution into the tanker. The tanker containing the pre-mixed solution may then be transported to the targeted location for application by spraying or the like.

SUMMARY

A device for dispensing particulate matter may include a gravimetric sensor to measure the weight of particulate matter mixed with a liquid carrier medium. In an illustrative embodiment, a dry chemical inductor includes a bin for containing particulate matter, a conduit for transporting a stream of liquid carrier, and a valve for controllably releasing a particulate matter from the bin into the conduit. The device may further include a gravimetric sensor, such as an electronic scale or a load cell, for measuring the weight of particulate matter released from the bin. A controller may receive signals from the gravimetric sensor and actuate the valve to interrupt the flow of particulate matter when the desired amount of particulate matter has been released.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1A:
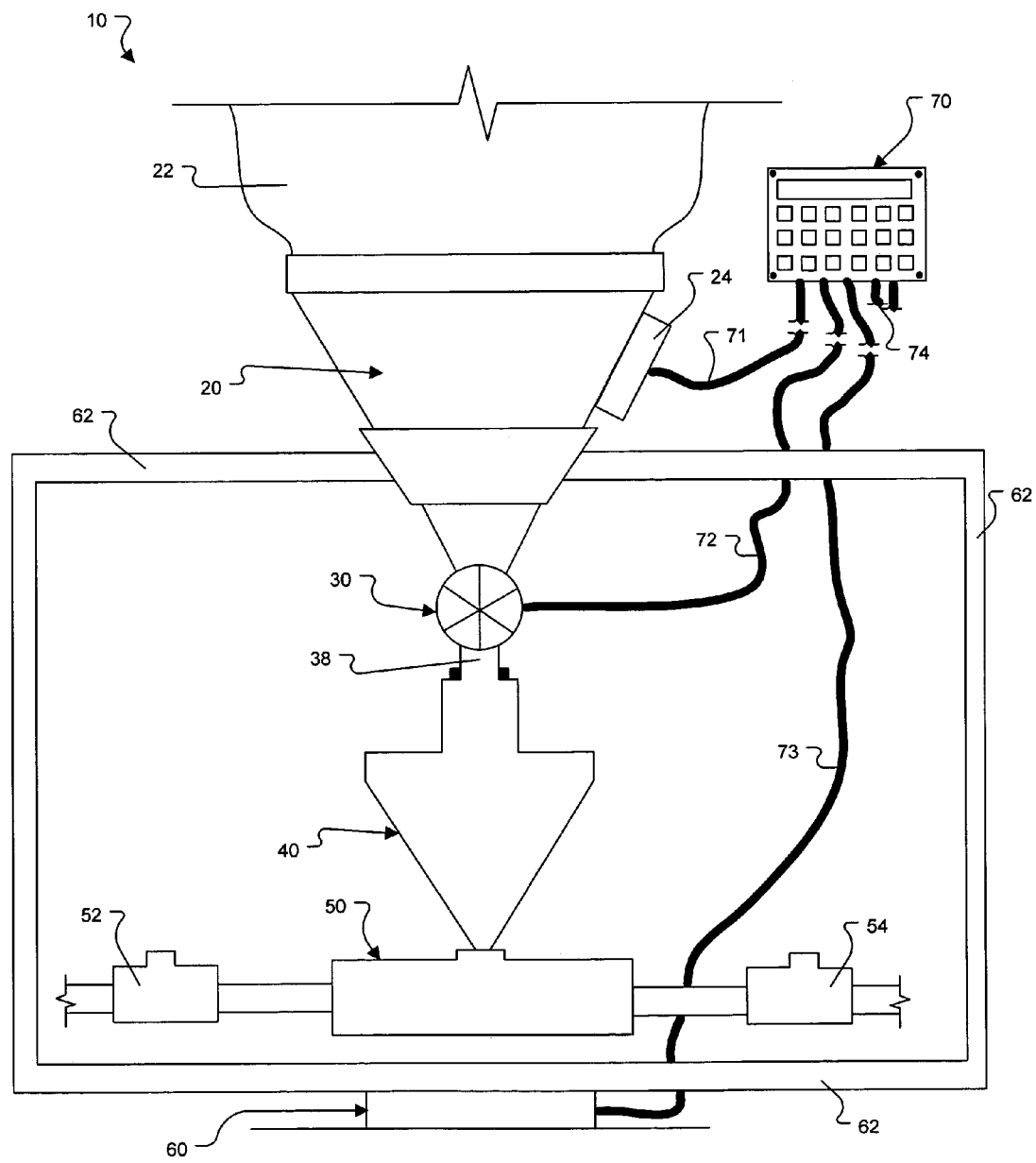
FIGS. 1A–1C are side views of certain components of chemical inductors in accordance with various embodiments of the invention.

Referring to FIG. 1, a weight-based particulate matter dispensing device, shown here as chemical inductor 10, includes a bin 20 adapted to contain particulate matter, such as chemical powder, granular material, or pelletized material that is not suspended in a liquid medium. A rotor valve includes a rotor 30 is connected to the lower portion of the bin 20 so that the particulate matter is funneled through the bin 20 and into the rotor 30. In the embodiment shown in FIG. 1, the rotor 30 includes multiple vanes that rotate in a housing to dispense the particulate matter from the bin 20. It will be understood, however, that any suitable rotor can be used, including drum rotors, vane rotors, swing-bucket rotors, fixed-angle rotors, V-rotors, auger rotors, cantilevered rotors, or balancing rotors. The rotor 30 controllably releases the particulate matter from the bin 20 into a chamber 40, which is design to funnel the particulate matter into a conduit 50 when a liquid carrier medium flows through the conduit 50. A gravimetric sensing device 60 (e.g., an electronic scale) is mechanically coupled to the bin 20 via a frame 62 such that the sensing device 60 may measure the gravimetric amount (e.g., weight or mass) of particulate matter that is released from the bin 20. The gravimetric sensing device 60 transmits signals to a control unit 70, which controls the flow of particulate matter through the rotor 30 and the flow of liquid carrier through the conduit 50. The control unit 70 processes the data from the gravimetric sensing device 60, and when the desired gravimetric amount of particulate matter is released from the bin 20, the control unit 70 signals the rotor 30 to cease the flow of particulate matter. In this embodiment, the inductor 10 (by way of the sensing device 60 and the control unit 70) directly measures the weight of particulate matter released from the bin 20. As such, the inductor 10 is able to measure and dispense the proper amount of particulate matter from the bin 20 regardless of changes to the internal volume of the rotor 30 or changes to the flow rate through the rotor 30.

The particulate matter may be fed into the bin 20 using a bag 22 or other like container. In the embodiment shown in FIG. 1, a vibratory device 24 is mechanically coupled to the bin 20 to facilitate the flow of particulate matter down through the bin 20 and into the rotor 30. The vibratory device 24 is electrically connected to the control unit 70 via a wire 71, and similarly, the rotor 30 is connected to the control unit via a wire 72. As such, the control unit 70 may activate the vibratory device 24 while activating the rotor 30 to release particulate matter from the bin 20. The particulate matter flows through the rotor 30 and exits through a dispensing tube 38 into the chamber 40. In this embodiment, the dispensing tube 38 is slideably engaged with the chamber 40 such that the bin 20, rotor 30, and dispensing tube 38 may vertically shift (depending on the load of particulate matter in the bin 20) with little or no vertical support from the chamber 40. Consequently, the load of particulate matter in the bin 20 is substantially transmitted to the gravimetric sensing device 60, which is mechanically coupled to the bin 20 via the frame 62. In the embodiment shown in FIG. 1, the gravimetric sensing device 60 is an electronic scale connected to the control unit 70 via a wire 73 such that the control unit 70 receives a signal from the sensing device 60 indicative of the weight or mass of particulate matter released from the bin 20. Alternatively, the gravimetric sensing device 60 may be used to measure the amount of particulate matter released from the bin 20 by transmitting a signal to the control unit 70 indicative of the total weight or mass of the inductor 10 at a particular time. In turn, the control unit 70 may calculate the gravimetric amount of particulate matter released from the bin 20 by comparing the total load at two different times.

After the particulate matter is released from the bin 20 and enters the chamber 40, the particulate matter is funneled into the conduit 50 for mixing with a liquid carrier. The liquid carrier may be forced through the conduit 50 using a high-pressure pump (not shown in FIG. 1). In certain embodiments, it is advantageous to force the liquid carrier medium through the conduit 50 only at designated times (e.g., only when particulate matter is released from the bin 20 for mixing), so conduit valves 52 and 54 may be used to restrict the flow of the liquid carrier medium. In the embodiment shown in FIG. 1, the conduit valves 52 and 54 are ball valves that are controlled by the control unit 70. Thus, the control unit 70 causes the ball valves 52 and 54 open the flow of liquid carrier medium through the conduit 50 when the particulate matter is to be mixed and causes the ball valves 52 and 54 to cease the flow through the conduit 50 at the appropriate times.

Figure 1B:
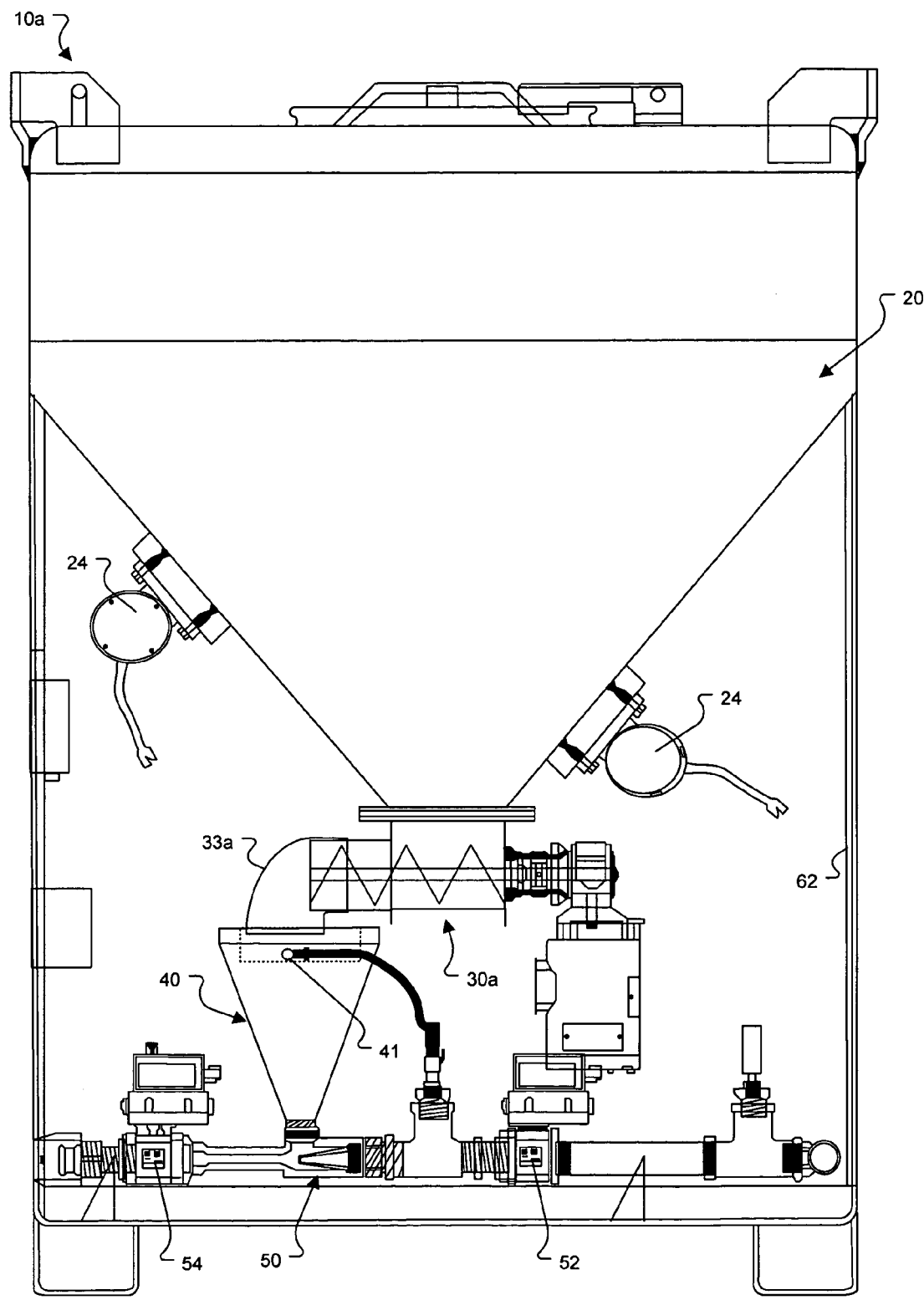

FIG. 1B illustrates an inductor 10a having an auger rotor 30a in lieu of a vane rotor. For simplicity, the gravimetric sensors and programmable logic controller 70 are not shown. The basic operation of inductor 10a is similar to that described above in connection with inductor 10 of FIG. 1A. Particulate matter is fed into bin 20, which is selectively vibrated by motors 24. Rotor 30a propels the particulate matter into the housing 33a, which is open to ambient atmosphere at its lower edge. The particulate matter falls into chamber 40 as a flushing liquid is supplied by valve 41. The flushing liquid spirals down the funnel-shaped chamber 40 in order to prevent particulate matter from adhering to the interior surface of the chamber 40.

Figure 1C:
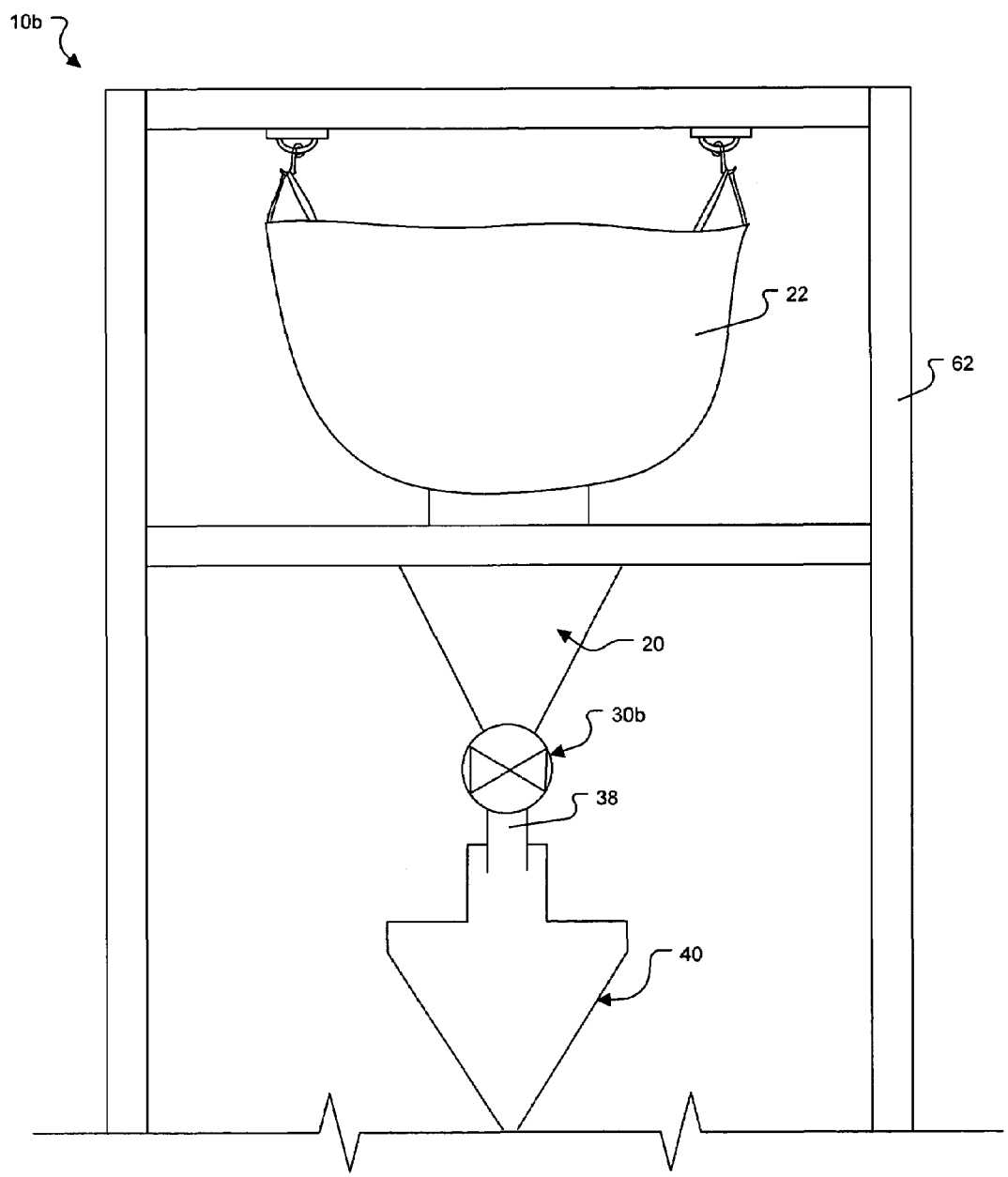

Turning to FIG. 1C, inductor 10b includes a manually actuated valve 30b instead of a rotor 30, 30a. Suitable valves include trunnion ball valves, butterfly valves, knife gate valves, and the like. In this embodiment, bag 22 is suspended from hooks attached to the frame 62. The control unit (not shown) may be used in connection with such an embodiment by, for instance, configuring the controller to signal an operator when the desired weight of particular matter has been removed from the bin. For instance, a user may signal the start of a dispensing operation by providing a predetermined input. In response, the controller may zero the scale input signal. During the dispensing operation, the scale input will be interpreted as an increasingly negative value. When the magnitude of that value reaches a predetermined set point provided by a user or a parent controller (described below), the controller may activate a speaker which provides a distinct audible tone which notifies the operator that the desired quantity has been dispensed. The signal may be provided in advance of the time at which the threshold is met in order to accommodate the time needed for the operator to react and close the valve 30b.

Figure 2:
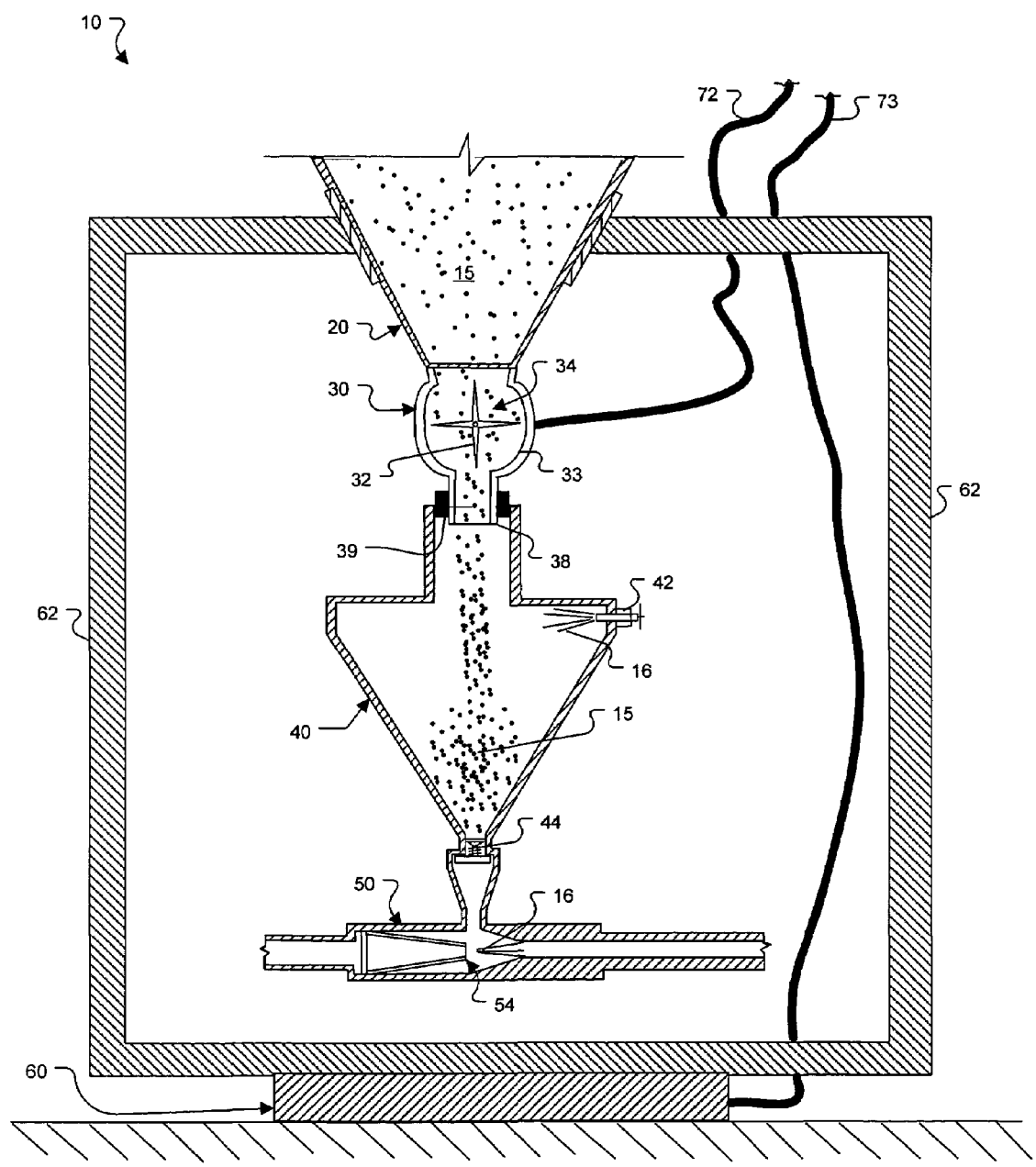
FIG. 2 is a cross-sectional view of the inductor of FIG. 1A.

Referring to FIG. 2, the rotor 30 may include a rotor assembly having multiple vanes 32 that rotate in a housing 33. The particulate matter 15 is funneled from the bin 20 and into cavities 34 between the vanes 32. As the vanes 32 rotate within the housing 33, the particulate matter 15 is incrementally released from the bin 20 and into the chamber 40. The control unit 70 (not shown in FIG. 2) may close the flow of particulate matter through the rotor 30 by causing the vanes 32 to stop rotating within the housing 33. The motionless vanes 32 effectively stop the release of particulate matter 15 from the bin 20. The control unit 70 may open the flow of particulate matter from the bin 20 by causing the vanes 32 to rotate and incrementally release the particulate matter 15 into the chamber 40.

The dispensing tube 38 may be slideably engaged with the chamber 40 such that the chamber 40 provides no substantial vertical support to the rotor 30 or the bin 20. In the embodiment shown in FIG. 2, the dispensing tube 38 has a sliding bearing 39 that engages the inner wall of the chamber 40. The sliding bearing 39 enables the dispensing tube 38 to slide in the vertical direction (depending on the load from the particulate matter in the bin 20) without transmitting a substantial load to the chamber 40 or conduit 50. As such, the load of particulate matter 15 in the bin 20 is substantially transmitted to the gravimetric sensing device 60 via the frame 62.

In certain embodiments, the chamber 40 includes a nozzle 42 to dispense a quantity of the liquid carrier medium 16 into the chamber 40 while the particulate matter is released from the rotor 30. The liquid carrier medium 16 that is dispensed from the nozzle 42 coats the interior walls of the chamber 40 and facilitates the movement of the particulate matter 15 through the chamber 40 and into the conduit 50. The nozzle 42 may be fluidly connected to the same source of liquid carrier medium 16 as the conduit 50 so that the liquid carrier medium 16 is sprayed into the chamber 40 only when the flow through the conduit 50 is opened.

Still referring to FIG. 2, the chamber 40 may also include a check valve 44 positioned at the lower portion of the interior walls. The check valve 44 helps to prevent undesirable leakage of a significant amount of liquid carrier medium 16 from the conduit 50 into the chamber 40, rotor 30, or bin 20. The check valve 44 provides a seal to block the flow between the chamber 40 and the conduit 50 until a particular threshold is achieved, in which case the check valve 44 permits the particulate matter 15 to flow from the chamber 40 and into the conduit 50. For example, the check valve 44 may open the flow when the flow rate of the liquid carrier medium 16 through the conduit 50 reaches a certain level. In some embodiments, the flow rate through the conduit 50 would reach this threshold level before the particulate matter 15 is even dispensed from the bin 20 so that the check valve 44 is already open when the particulate matter 15 reaches the chamber 40. The control unit 70 may be used to achieve this result by transmitting a signal to the control unit 70 indicative of the flow rate through the conduit 50 before the control unit 70 activates the rotor 30 to controllably release particulate matter 15 from the bin 20.

In the embodiment shown in FIG. 2, the conduit 50 includes an eductor 54 to facilitate the mixing of the particulate matter 15 and the liquid carrier medium 16. The eductor 54 exposes the flowing stream of liquid carrier medium 16 to the particulate matter 15 dispensed from the chamber 40. Moreover, when the flow rate of the liquid carrier medium 16 reaches a certain level, a vacuum effect is achieved and the particulate matter 15 is drawn toward the stream of liquid carrier medium for mixing. In some embodiments, this vacuum effect may be used to open the check valve 44 and permit the particulate matter 15 to flow from the chamber 40. After mixing in the eductor 54, the solution of particulate matter 15 and liquid carrier medium 16 proceeds to flow through the exit of the conduit 50.

Figure 3:
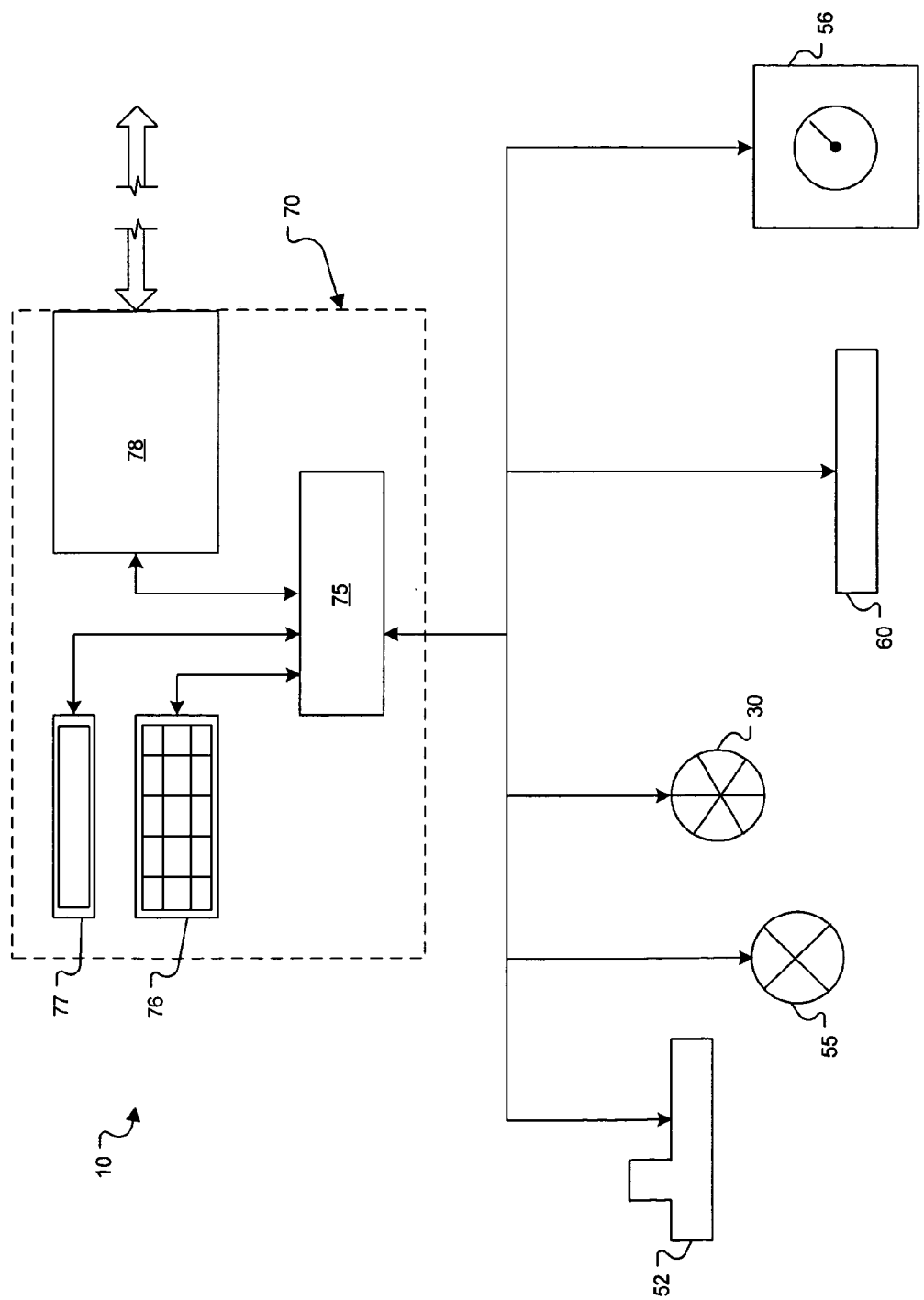
FIG. 3 is a diagram of one embodiment of a local control system for the chemical inductor of FIG. 1A.

Referring to FIG. 3, the control unit 70 includes a local controller 75, a user interface device 76, a display 77, and a network communication device 78. The controller 75 may be specifically adapted for use with the control unit 70 and inductor 10, or in some embodiments, a specially configured personal computing system may serve as the control unit 70. The user interface device 76 permits a local user of the chemical inductor 10 to input data (e.g., authorization password, material properties, desired concentration of the solution, and the like). The interface 76 may be embodied as a keypad, touchscreen, mouse, or other similar device. Depending on the complexity of the control unit 70, the display 77 may be an alphanumeric display device to show the operational status of the chemical inductor 10 and to facilitate interaction between the local user and the control unit 70. The network communication device 78 may be embodied as a modem, a network controller coupled to a LAN, WAN, WiFi, an IP portal, or other electronic communication means. Using the network communication device 78, the controller 75 may be configured to request and receive firmware or software updates, upload or download operational data, instructions, commands, and the like. For example, the controller 75 may upload to a central network node (not shown in FIG. 3) operational data that includes system status information, fault information, and information indicating the amount and type of chemical dispensed from the inductor 10.

The local controller 75 controls the conduit valves 52, pump 55, the rotor 30, and other devices involved in the release of particulate matter 15 from the bin 20 and the flow of the liquid carrier medium 16 through the conduit 50. In addition, the controller 75 is connected to various sensing devices, such as the gravimetric sensing device 60 to indicate the amount of particulate matter 15 released from the bin 20 and a flow meter 56 to indicate the flow rate of the liquid carrier medium 16 through the conduit 50. The control lines between the controller 75 and the devices may transmit start/stop signals, status signals, DC current, transducer I/O, and the like.

Figure 4:
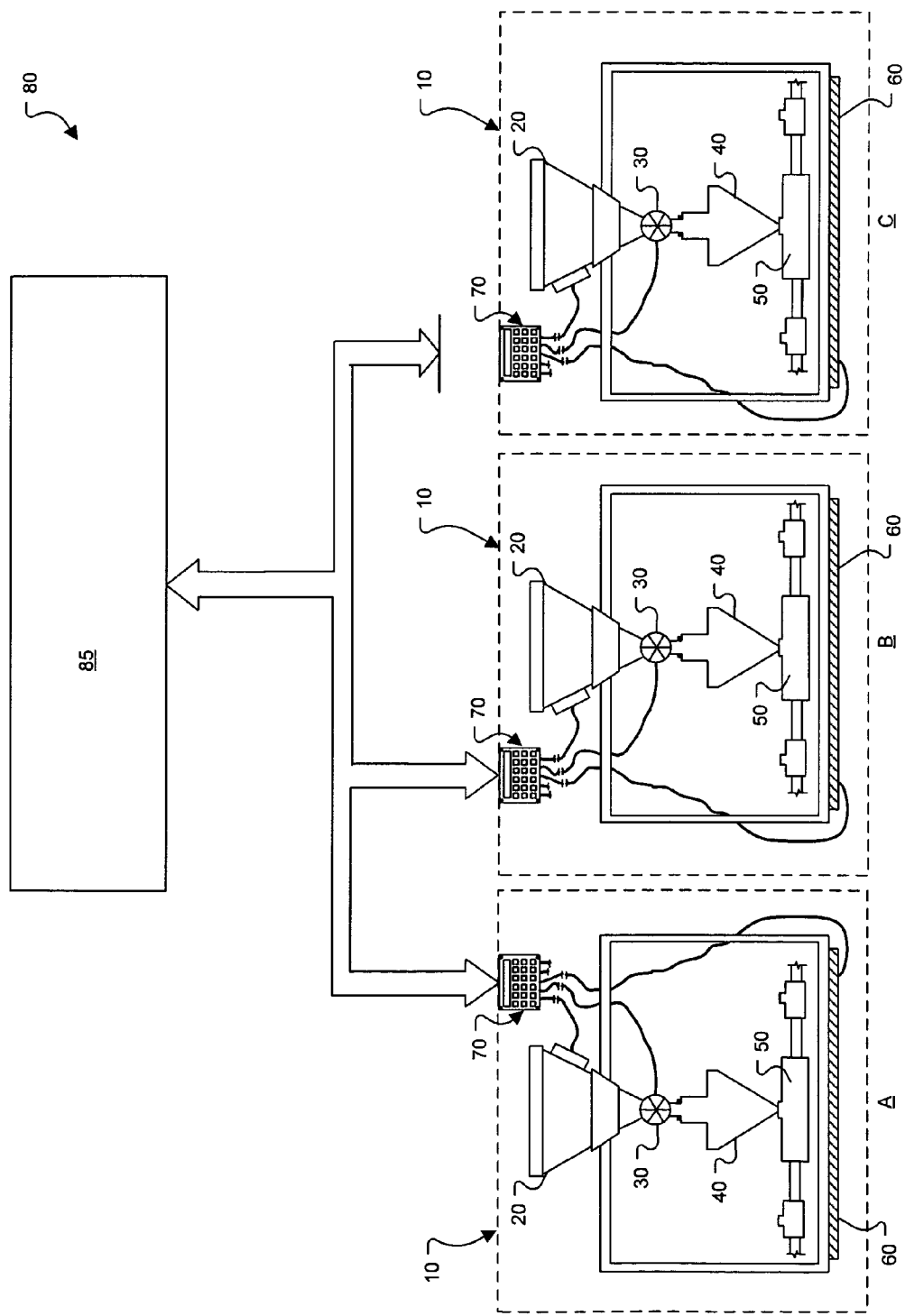
FIG. 4 is a diagram of a distributed control system for centrally controlling at least one chemical inductor of FIG. 3.
Figure 5:
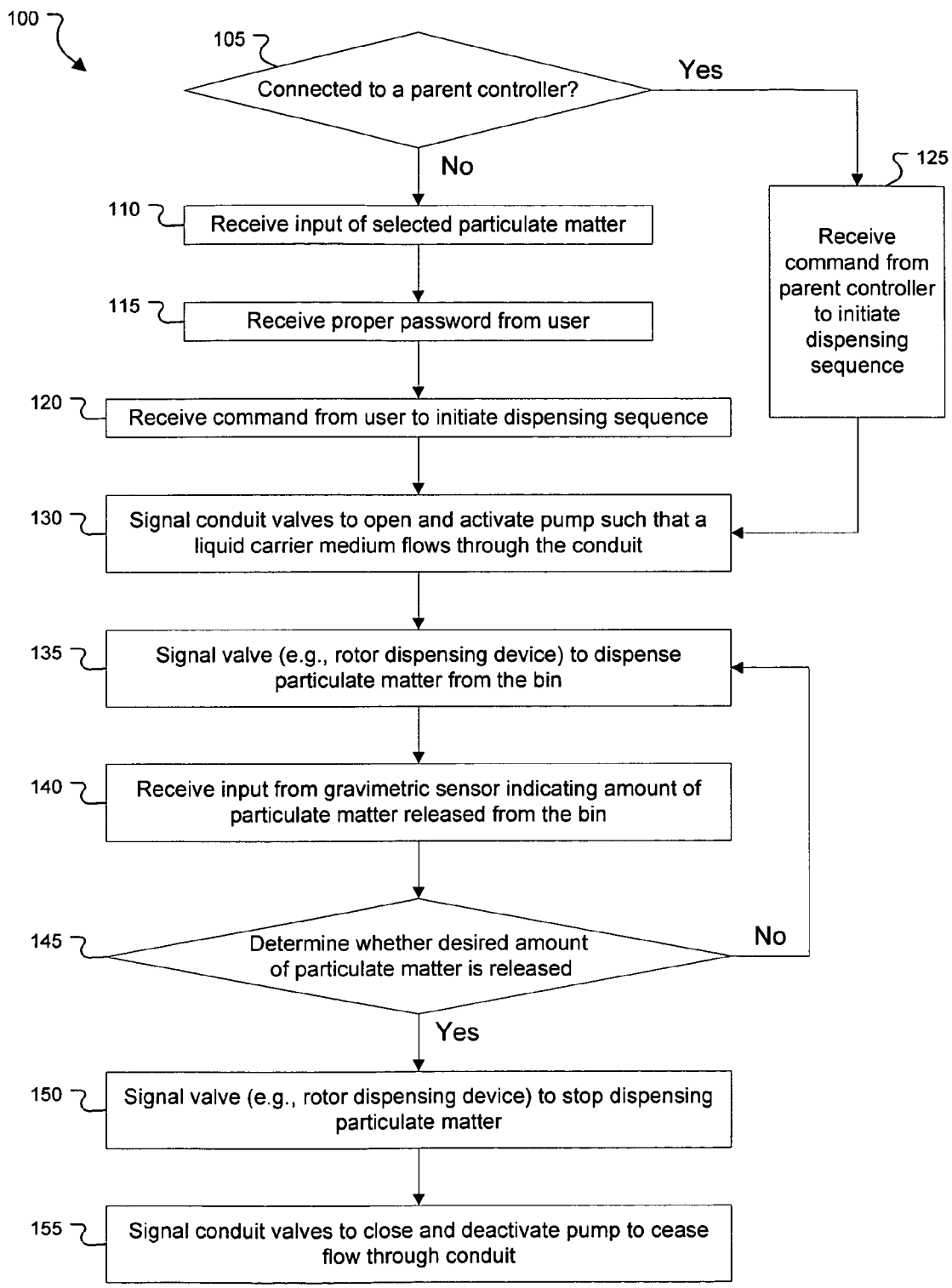
FIG. 5 is a diagram of the control process for the local control system of FIG. 3.

Referring to FIG. 4, one or more chemical inductors 10 may be used in a distributed control network 80. The control unit 70 of each chemical inductor 10 may be connected to a parent controller 85 via network communication devices 78 (shown in FIG. 3), yet the chemical inductors 10 may also operate while disconnected from the parent controller 85. In the embodiment shown in FIG. 4, the control units 70 of chemical inductors A and B are connected to the parent controller 85 while inductor C is disconnected from parent controller 85. The inductors A, B, and C may contain different chemical matter in their respective bins 20. While chemical inductors A and B release particulate matter from their respective bins 20 and dispense a chemical solution, operational data and other information may be instantly communicated to the parent controller 85 or periodically transferred to the parent controller 85 from local memory in the control unit 70. Chemical inductor C may be used to release particulate matter from its bin 20 and dispense a chemical solution, and after each use or a certain amount of time, inductor C may be temporarily connected to the parent controller 85 to periodically transfer operational data and other information. An operator of the distributed control network 80 may monitor the use of the chemicals dispensed from the chemical inductors 10, manage inventory and re-supply shipments, and issue invoices based upon usage or other metrics.

In certain embodiments, the control lines between the parent controller 85 and the individual control units 70 include a system status line, start/stop line, sensor line, and a DC supply voltage line. The sensor line may transmit to the parent controller 85 raw data from the sensing devices 60 and 56 or a derived/calculated value indicative of the weight or mass of particulate matter dispensed from the chemical inductor 10. Other control lines may transmit chemical selection information, password/access control information, and the like. In some embodiments, the parent controller 85 may be networked directly with the devices (e.g., conduit valves 52, pump 55, rotor 30, gravimetric sensing device 60, flow meter 56, etc.) on the individual chemical inductors 10. For example, the parent controller 85 may provide and receive control signals similar to those described above in connection with FIG. 3.

Referring to FIG. 5, the operation of the chemical inductor 10 is shown from the perspective of the process flow 100 of the local control unit 70. When the chemical inductor is idle (e.g., not mixing or dispensing a chemical solution), the conduit valves 52 are closed to prevent flow through the conduit 50, and the rotor 30 is closed to prevent flow of particulate matter 15 from the bin 20. The first step 105 in the process flow 100 of the control unit 70 is to determine whether the chemical inductor 10 is under the control of the parent controller 85. If the chemical inductor 10 is disconnected from the distributed control network 80, the parent controller 85 does not control the chemical inductor 10, and the process 100 continues to the local activation steps 110, 115, and 120. Alternatively, the chemical inductor 10 may be connected to the distributed control network 80, but the parent controller 80 may permit a user to locally activate the chemical inductor 10 using the control unit 70, in which case the process 100 may continue to steps 110, 115, and 120. In step 110, the chemical inductor 10 may be locally activated when the control unit 70 receives input concerning the particulate matter to be dispensed (e.g., type of chemical, desired concentration of the solution, weight of particulate matter to be released from the bin 20, or the like). Referring to step 115, the local activation may be blocked by password protection, in which case the control unit 70 must receive the proper password via the user interface device 76. After the proper information and password is input, in step 120 the control unit 70 may receive a signal from the user (e.g., by pressing a "start" button) to initiate the dispensing sequence.

Still referring to FIG. 5, the chemical inductor 10 connected to a distributed control network 80 may be activated by the parent controller 85. For example, if the control unit 70 determines that the inductor 10 is under the control of the parent controller 85 (step 105), the control unit 70 awaits a signal from the parent controller 85 to initiate the dispensing sequence (step 125). In some embodiments, the central operator of the distributed control network 80 may input information concerning the particulate matter to be dispensed (e.g., type of chemical, desired concentration of the solution, weight of particulate matter to be released from the bin 20, or the like), and the parent controller 85 relays this information to the control unit 70 along with a command to initiate the dispensing sequence.

Upon completion of step 120 or step 125, the control unit 70 causes the conduit valves 52 to open and activates the pump 55 such that the liquid carrier medium 16 flows through the conduit 50 (step 130). Then the process 100 continues to step 135 where the control unit 70 causes the rotor 30 to release particulate matter from the bin 20. In some embodiments, the rotor 30 is activated to release particulate matter from the bin 20 only after the flow rate of liquid carrier medium through the conduit 50 reaches a certain level so as to open the check valve 44. While the control unit 70 causes the rotor 30 to release particulate matter from the bin 20, the control unit receives signals from the gravimetric sensing device 60 indicative of the weight or mass of particulate matter released from the bin 20 (step 140). Upon receiving such signals from the gravimetric sensing device 60, the control unit 70 determines whether the desired amount of particulate matter has been released from the bin 20 (step 145). If an insufficient amount of particulate matter has been released, the control unit 70 causes the rotor 30 to continue releasing particulate matter (return to step 135). When the desired amount of particulate matter has been released, the control unit 70 causes the rotor 30 to close the flow of particulate matter (step 150). As shown in step 155, the control unit 70 then causes the conduit valves 52 to close and deactivates the pump to cease flow of the liquid carrier medium through the conduit 50. The chemical inductor then returns to an idle status and awaits further commands from a user or from the parent controller 85.

Figure 6:
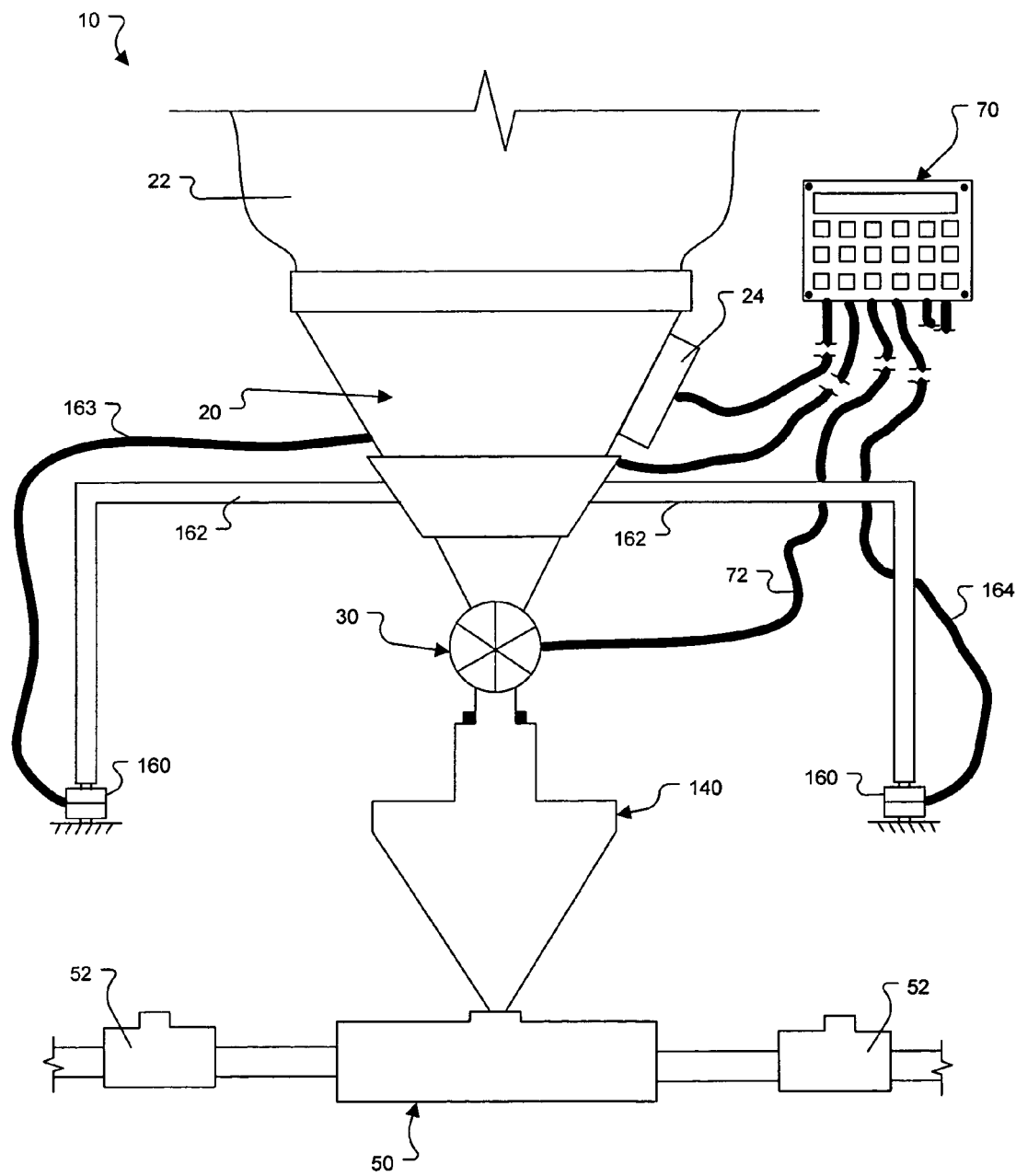
FIG. 6 is a side view of certain components of a chemical inductor in accordance with another embodiment of the invention.

Referring to FIG. 6, the chemical inductors 10 may use gravimetric sensing devices other than an electronic scale. For example, the chemical inductor 10 shown in FIG. 6 includes load cells 160 that are mechanically coupled to the bin 20 via a frame 162 to sense the load of particulate matter 15 in the bin 20. The load cells 160 are connected to the control unit 70 via wires 163 and 164 such that the control unit 70 receives signals indicative of the weight or mass of particulate matter 15 released from the bin 20. Likewise, other gravimetric sensing devices may be connected to the control unit 70 and used to sense the gravimetric amount of particulate matter that is released from the bin 20.

In one embodiment, the inductor 10 may include a control unit 70 that operates wirelessly. For example, one or more of the controlled components or sensing devices (e.g., conduit valves 52, pump 55, rotor 30, gravimetric sensing device 60, flow meter 56, etc.) may communicate with the controller 75 using infrared transmitters/receivers, RF transmitters/receivers, or other wireless communication means.

In another embodiment, the inductor may operate without a complex control unit 70. Rather, a local controller may be housed within the gravimetric sensing device 60 and electrically coupled to the rotor 30. For example, the gravimetric sensing device 60 may comprise an electronic scale having a self-calibrating controller housed inside the scale such that the controller may "zero" the electronic scale before each use of the inductor 10. When the electronic scale signaled that the desired amount of particulate matter was released, the controller would transmit a signal directly to the rotor 30, which may comprise a solenoid valve, to cease the flow of particulate matter.

In yet other embodiments, the conduit carries a gaseous fluid. In such embodiments, a high pressure pump may be used to propel ambient air through a suitable eductor such as an expansion valve. Particulate or liquid herbicide, adjuvant, fertilizer, or the like may be dispensed into the air stream via one or more of the techniques described above.

A number of embodiments of the invention have been described. Nevertheless, it will be understood that various modifications may be made without departing from the spirit and scope of the invention. Accordingly, other embodiments are within the scope of the following claims.

What is claimed is:

1. A device for dispensing particulate matter into a fluid stream, comprising:
   a supply of dry particulate matter;
   a transport member adapted to receive the particulate matter and a fluid stream;
   a sensor to detect a weight of at least a portion of the particulate matter; and
   a controller to monitor the weight of particulate matter dispensed into the fluid stream.

2. The device of claim 1, wherein the controller determines the weight of particulate matter dispensed into the fluid stream.

3. The device of claim 1, further comprising means to start or stop the dispensation of the particulate matter into the fluid stream.

4. The device of claim 1, further comprising a valve connected to the transport member for controllably releasing a quantity of the particulate matter from a container into the transport member.

5. The device of claim 4, wherein the valve includes a rotor assembly comprising an auger.

6. The device of claim 1, wherein the sensor comprises a transducer selected from the group consisting of a load cell and a scale.

7. The device of claim 6, wherein the controller is housed in the scale and the container comprises a flexible bin.

8. The device of claim 1, wherein the sensor detects a weight of a portion of the particulate matter before it is dispensed into the fluid stream.

9. The device of claim 1, wherein the sensor is operative to measure a weight that includes the weight of the particulate matter and the weight of a bin containing the particulate matter.

10. The device of claim 1, wherein the sensor is operative to measure a weight that includes the weight of the particulate matter and the weight of the dispensing device.

11. The device of claim 1, wherein the controller is wirelessly coupled to the sensor.

12. The device of claim 1, wherein the controller comprises a programmable logic controller that receives a signal associated with the weight of a quantity of a particular matter held in a container and wherein the programmable logic controller calculates the weight of particulate matter dispensed during an interval.

13. The device of claim 1, wherein the transport member comprises an eductor and the particulate matter is selected from the group consisting of pesticides, herbicides, fertilizers, and adjuvants.

14. The device of claim 1, wherein the controller generates a signal in response to which the flow of particulate matter into the conduit is initiated, stopped, or throttled.

15. The device of claim 1, wherein the transport member is a generally cylindrical conduit.

16. The device of claim 1, 2, 3, 4, 5, 6, 7, 8, 9, 10, 11, 12, 13, 14 or 15, wherein the device further comprises a vibrator to facilitate the dispensation.

17. A device for dispensing particulate matter, comprising:
   a container for holding particulate matter;
   a conduit for transporting a stream of liquid carrier, the conduit being operative to receive particulate matter from the container;
   a means for detecting a weight of at least a portion of the particulate matter; and means for determining a weight of material dispensed into the liquid carrier.

18. The device of claim 17, wherein the determining means comprises a means for receiving an input from the detecting means and for generating a signal in response to which a flow of particulate matter into the conduit is modified.

19. The device of claim 17, further comprising a means connected to the container for controllably releasing a quantity of the particulate matter from the container into the conduit.

20. The device of claim 18, wherein the receiving and generating means determines the weight or mass of particulate matter that is released from the container into the conduit.

21. The device of claim 18, wherein the detecting means comprises at least one load cell or an electronic scale.

22. The device of claim 21, wherein the receiving and generating means is housed in the electronic scale.

23. The device of claim 17, wherein detecting means is operative to measure a gravimetric amount that includes the weight of the particulate matter, the container, and a frame.

24. The device of claim 18, wherein the receiving and generating means is wirelessly coupled to the detecting means.

25. The device of claim 18, wherein the receiving and generating means generates a signal in response to which the flow of particulate matter into the conduit is initiated, stopped, or throttled.

26. A system for controlling a networked array of dispensing devices, comprising:
a first dispensing device;
a second dispensing device for dispensing particulate matter, the second dispensing device comprising:
a container for holding particulate matter;
a conduit for transporting a stream of liquid carrier, the conduit being operative to receive particulate matter from the container;
a sensor to detect a weight of at least a portion of the particulate matter; and
a local controller coupled to the sensor to generate a signal when a predetermined quantity of particulate matter is dispensed in response to which the flow of particulate matter into the conduit is modified;
a parent controller coupled to the first and second dispensing devices, wherein the parent controller is operative to transmit a first set of instructions to the second dispensing device and the local controller is operative to generate a second set of instructions.

27. The system of claim 26, wherein the local controller is operative to transmit status information to the parent controller.

28. The system of claim 26, wherein the second dispensing device further comprises a valve connected to the bin for controllably releasing a quantity of the particulate matter from the container into the conduit.

29. The system of claim 28, wherein the sensor of the second dispensing device is operative to detect the weight of particulate matter held in the container.

30. The system of claim 26, wherein the sensor comprises an electronic scale.

31. The system of claim 26, wherein the first set of instructions comprises instructions selected from the group consisting of start, stop, and chemical select commands.

32. A device for dispensing particulate matter into a fluid stream, comprising:

a supply of dry particulate matter selected from the group consisting of pesticides, herbicides, fertilizers, and adjuvants;

a transport member adapted to receive the particulate matter and a fluid stream;

a sensor to detect a weight of at least a portion of the particulate matter; and a controller to monitor the weight of particulate matter dispensed into the fluid stream.

33. The device of claim 32, wherein the controller determines the weight of particulate matter dispensed into the fluid stream.

34. The device of claim 32, further comprising means to start or stop the dispensation of the particulate matter into the fluid stream.

35. The device of claim 32, further comprising a valve connected to the transport member for controllably releasing a quantity of the particulate matter from a container into the transport member.

36. The device of claim 35, wherein the valve includes a rotor assembly comprising an auger.

37. The device of claim 32, wherein the sensor comprises a transducer selected from the group consisting of a load cell and a scale.

38. The device of claim 37, wherein the controller is housed in the scale and the container comprises a flexible bin.

39. The device of claim 32, the sensor detects a weight of a portion of the particulate matter before it is dispensed into the fluid stream.

40. The device of claim 32, wherein the sensor is operative to measure a weight that includes the weight of the particulate matter, a bin, a frame.

41. The device of claim 32, wherein the controller is wirelessly coupled to the sensor.

42. The device of claim 32, wherein the controller comprises a programmable logic controller that receives a signal associated with the weight of a quantity of a particular matter held in a container and wherein the programmable logic controller calculates the weight of particulate matter dispensed during an interval.

43. The device of claim 32, wherein the transport member comprises an eductor.

44. The device of claim 32, wherein the controller generates a signal in response to which the flow of particulate matter into the conduit is initiated, stopped, or throttled.

45. The device of claim 32, wherein the transport member is a generally cylindrical conduit.

46. The device of claim 32, 33, 34, 35, 36, 37, 38, 39, 40, 41, 42, 43, 44 or 45, wherein the device further comprises a vibrator to facilitate the dispensation.

47. A device for dispensing dry material into a fluid stream, comprising:

a conduit for transporting a stream of fluid carrier, the conduit being adapted to receive a supply of dry material;

a sensor to measure a weight or mass that includes the weight or mass of at least a portion of the dry material; and a controller coupled to the sensor to generate a signal in response to which a flow of dry material into the conduit is modified.

48. The device of claim 47, wherein sensor is operative to measure a weight that includes the weight of the dry material and the weight of a bin that contains the particulate matter.

49. The device of claim 47, wherein the dry material is a particulate matter comprising a fertilizer, pesticide, herbicide, or adjuvant.

50. The device of claim 49, wherein the controller comprises a programmable logic controller that receives a signal associated with the weight of a quantity of a particular matter held in a container and wherein the programmable logic controller calculates the weight of particulate matter dispensed during an interval.

51. A method for dispensing particulate matter into a fluid stream, comprising:
providing a fluid stream;
providing a supply of particulate matter to be dispensed into the fluid stream;
sensing a weight of at least a portion of the particulate matter;
monitoring the weight of the particular matter dispensed into the fluid stream; and
modifying the rate at which the particulate matter is dispensed based on the monitored weight.

52. The method of claim 51, wherein modifying comprises starting, stopping, or throttling.

53. The method of claim 51, wherein the monitoring comprises detecting a weight with a transducer.

54. The method of claim 51, further comprising determining when the weight of particulate matter dispensed meets a predetermined threshold.

55. The method of claim 51, wherein the supply of particulate matter is provided in a closed flexible container.

56. The method of claim 55, further comprising determining the change in weight of particulate matter in said container.

57. The method of claim 52, wherein said particulate matter is selected from the group consisting of pesticides, herbicides, fertilizers, and adjuvants.

58. The method of claim 55, further comprising determining the change in weight of particulate matter in said container.

59. A method for dispensing particulate matter into a fluid stream using a device for dispensing particulate matter, comprising:
providing a fluid stream;
measuring a first weight associated with the dispensing device;
providing a quantity of particulate matter to be dispensed into the fluid stream;
measuring a second weight associated with the dispensing device after the initiation of the dispensing of said particulate matter;
ceasing the dispensing of said particulate matter based on the first and second measured weights.

60. The method of claim 59, wherein the first measured weight includes the weight of an amount of the particulate matter and a bin coupled to the dispensing device.

61. The method of claim 59, wherein the second measured weight differs from said first measured weight by substantially the weight of particulate matter dispensed into said fluid stream during an interval.

* * * * *